United States Patent [19]
Maeda et al.

[11] Patent Number: 5,224,087
[45] Date of Patent: Jun. 29, 1993

[54] APPARATUS FOR RECORDING COMPRESSED DIGITAL INFORMATION TO AN OPTICAL DISC

[75] Inventors: Yasuaki Maeda; Ryo Ando; Hideki Nagashima, all of Tokyo, Japan

[73] Assignee: Sony Corporation, Tokyo, Japan

[21] Appl. No.: 747,182

[22] Filed: Aug. 19, 1991

[30] Foreign Application Priority Data

Aug. 24, 1990 [JP] Japan .................. 2-222824

[51] Int. Cl.$^5$ .............................................. G11B 7/00
[52] U.S. Cl. ........................................ 369/54; 369/47; 369/116; 369/124
[58] Field of Search ................ 369/54, 53, 58, 59, 369/47, 48, 49, 32, 44.32, 33, 116, 124; 395/425

[56] References Cited

U.S. PATENT DOCUMENTS

| | | | |
|---|---|---|---|
| 4,707,818 | 11/1987 | Suzuki et al. | 369/32 |
| 4,777,545 | 10/1988 | Shoji et al. | |
| 4,827,462 | 5/1989 | Flannagan et al. | 369/32 |
| 4,893,193 | 1/1990 | Nakamura et al. | 369/49 |
| 5,023,854 | 6/1991 | Satoh et al. | 369/54 |

FOREIGN PATENT DOCUMENTS

0364586A1 4/1990 European Pat. Off. .
0383298A2 8/1990 European Pat. Off. .

*Primary Examiner*—Andrew L. Sniezek
*Assistant Examiner*—Mohammad Edun
*Attorney, Agent, or Firm*—Philip M. Shaw, Jr.

[57] ABSTRACT

An apparatus for recording compressed digitized information to an optical disc by reading the digital data into a memory for transient storage. The digital input data thus written into the memory are sequentially read out of the memory and into an encoder at a transfer rate faster than the input transfer rate where the digital data are arranged in discrete clusters of record units including cluster-linking groups such that each record unit can be interleaved independently and without affecting other record units. The interleaved record units are then recorded onto an optical disc. Reproduction of the record units from the optical disk is carried out by reversing the process.

14 Claims, 9 Drawing Sheets

| 1 BYTE | | | |
|---|---|---|---|
| OOH | FFH | FFH | FFH |
| FFH | FFH | FFH | FFH |
| FFH | FFH | FFH | OOH |
| MIN | SEC | BLOCK | MODE |
| D0001 | D0002 | D0003 | D0004 |
| D0005 | D0006 | D0007 | D0008 |
| D0009 | D0010 | D0011 | D0012 |
| ⋮ | ⋮ | ⋮ | ⋮ |
| D2329 | D2330 | D2331 | D2332 |
| D2333 | D2334 | D2335 | D2336 |

FIG. 5

| D0001 FILE NUMBER | D0002 CHANNEL NUMBER | D0003 SUBMODE | D0004 DATA TYPE |
|---|---|---|---|
| D0005 FILE NUMBER | D0006 CHANNEL NUMBER | D0007 SUBMODE | D0008 DATA TYPE |

MEMORY CONTROL IN RECORDING SYSTEM

FIG.10

MEMORY CONTROL IN REPRODUCING SYSTEM

FIG.11

APPARATUS FOR RECORDING COMPRESSED DIGITAL INFORMATION TO AN OPTICAL DISC

BACKGROUND OF THE INVENTION

1. Field of the Invention

This invention relates to an optical disc recording apparatus adapted for processing input data digitized from continuous, i.e. analog signals with compression and subsequently recording the resulting bit compressed data on an optical disc.

2. Description of Related Art

An optical disc may have a recording capacity larger by two or three digits than that of a magnetic disc, while enabling accessing at a higher speed than that for a tape recording medium. The optical disc also has an advantage that it enables contactless data recording/reproduction on or from the medium, and is superior in durability, so that it has become more popular in recent years. A so-called compact disc (CD) is among the widely known types of the optical discs.

Meanwhile, for providing a portable and, above all, a pocketable headphone stereo or similar recording/reproducing apparatus, with the use of the optical disc, a compact disc with a disc diameter of 12 cm and a compact disc with a disc diameter of 8 cm (so-called CD single) have been prescribed, as for as the disc format is concerned. However, with the disc diameter of 12 cm, the recording/reproducing apparatus becomes too bulky to be portable. Therefore, a disc 8 cm or less in diameter may be thought to be convenient. However, if it is attempted to construct a portable or pocket size recording and/or reproducing apparatus with the use of an optical disc 8 cm or less in diameter, the following problem is raised.

In the case of a standard CD format, in which an optical disc, on which are recorded stereophonic digital PCM audio signals sampled with a sampling frequency of 44.1 kHz and quantized by 16 bits, is supplied by a producer, and in which these signals are exclusively reproduced by the user (CD-DA format), the playback time (recording time) of the disc which is 8 cm in diameter is 20 to 22 minutes at most, meaning that a symphony of classical music can not be recorded completely on one disc side. A playback time of 74 minutes or longer, which is approximately equal to that of the compact disc 12 cm in diameter, is desired. In addition, with this CD-DA format, recording by the user is not feasible. In addition, a contactless type optical pickup device is vulnerable to mechanical vibrations and subject to detracking or defocusing. Thus, when the apparatus is to be portable, some strong measures need to be taken to prevent adverse effects of detracking or defocusing on the reproducing operation.

With the CD-I (CD-interactive) format, the levels A to C as shown in the following Table 1 are prescribed as modes for recording/reproducing bit-compressed digital audio signals.

TABLE 1

| levels | sampling frequency | number of bits for quantization | bandwidth | playback time (stereo/monaural) |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

When reproducing a disc recorded with, for example, the level B mode, signals obtained by fourfold bit compression of standard CD-DA format digital signals are reproduced. Thus, if all of the recorded data are stereophonic audio compressed data, playback time becomes fourfold, or reproduction of four-channel data, becomes feasible, so that reproduction for 70 minutes or longer becomes possible with an optical disc of the order of 6 cm in diameter.

Meanwhile, with the CD-I format, the disc is rotationally driven at the same linear velocity as that for the standard CD-DA format, so that the continuous audio compressed data are reproduced at a rate of one unit to n recorded units on the disc where n is a figure corresponding to the playback time or the bit compression rate of data and is equal to 4(n=4) with the level B stereo mode. This unit is termed a block or sector which is made up of 98 frames and has a period of 1/75 second. Therefore, with this level B stereo mode, a data string in which one of four sectors is an audio sector, such as

S D D D S D D D ...

where S is an audio sector and D is other data sector or sectors, is recorded on the sector-by-sector basis on the disc. However, for actual recording, since the above data string undergoes a predetermined encoding similar to that for ordinary CD format audio data, such as error correction coding and interleaving, data of the audio sector S and data of the data sector D are arranged in a scrambled fashion in the recording sectors on the disc. The other data sectors D may for example be video or computer data. When the bit-compressed audio signals are also used for the data sector D, a data string in which four-channel audio sectors S1 to S4 are cyclically arranged, that is a data string

S1 S2 S3 S4 S1 S2 S3 S4 ...

is encoded and recorded on the disc. When recording and reproducing continuous audio signals, channel 1 data corresponding to the audio sector S1 are reproduced from the innermost to the outermost sides of the disc. Channel 2 data corresponding to the audio sector S2 are reproduced from the innermost to the outermost sides of the disc. Channel 3 data corresponding to the next audio sector S3 are reproduced from the innermost to the outermost sides of the disc. Finally, channel 4 data corresponding to the audio sector S4 are reproduced from the innermost to the outermost sides of the disc to enable data reproduction for a continuous fourfold time duration.

However, for the above mentioned continuous reproduction, several track jump operations of a long distance spanning the inner and outer disc peripheries are necessitated. Since the track jump can not be achieved instantaneously, playback data become depleted for a short time period, meaning that the playback sound is momentarily interrupted. On the other hand, when continuous audio signals are to be recorded, it is not possible to record only the sector 2 signals, as an example, because the data need to undergo interleaving at the time of recording. That is, sector 2 data need to be interleaved with adjoining and even near-by sectors, such as sectors S1 and S3, such that it becomes necessary to rewrite signals of previously recorded sectors. Thus it is extremely difficult to record the continuous compressed audio data, while real-time processing is virtually impossible.

OBJECTS AND SUMMARY OF THE INVENTION

It is an object of the present invention to provide an optical disc recording apparatus wherein audio data may be continuously recorded on a real time basis on a disc-shaped recording medium such as a write once optical disc or an overwritable magneto-optical disc.

It is another object of the present invention to provide an optical recording apparatus having the function of detecting an abnormality in the recording operation such as a track jump or defocusing due to mechanical disturbances such as vibrations or collision for re-recording data on a cluster-by-cluster basis.

The present invention provides; an optical disc recording apparatus for recording digital data on a disc-shaped recording medium by optical means comprising memory means for transiently storing input digital data time compressed digitized analog signals; a signal processing means for arranging digital data read out from said memory means into a plurality of clusters at an interval of a predetermined number of sectors, for annexing to each of the clusters a cluster-linking group including a plurality of sectors such that the cluster-linking group extends beyond data in a cluster to be interleaved in an interleaving operation, and for processing digital data of said clusters by the interleaving operation recording means for recording digital data obtained by said signal processing means on said disk-shaped recording medium; an abnormality detection means for detecting abnormalities in the recording operation in said recording means, resetting control means for inhibiting said recording operation and for resetting said recording means from an abnormal state to a normal state upon detection of an abnormality by said abnormality detection means; a memory control means for performing a readout control of said memory means for reading a predetermined amount of said recording data on a cluster-by-cluster basis when an amount of data of said input digital data stored in said memory means exceeds a present first predetermined amount to maintain a writable space larger than a second predetermined amount of data in said memory means; and a recording control means for performing a recording position control for continuously recording recording data intermittently read out cluster-by-cluster from said memory means by said memory control means on a recording track of said disc-shaped recording medium.

With the optical disc recording apparatus according to the present invention, input data digitized from analog signals are written in memory means, the data thus written in the memory means are sequentially read out as record data having a transfer rate faster than transfer rate of said input data so as to be interleaved by record means for recording on a cluster-by-cluster basis on said optical disc.

Cluster-linking sectors longer than an interleaving length are arrayed between the clusters, such that, by recording the clusters and the cluster-linking sectors simultaneously, it becomes possible to eliminate the effects of interleaving on adjoining clusters. With the cluster and cluster-linking sector as a recording unit, recording may be made independently cluster-by-cluster without taking account of the effects of interleaving on other clusters, such that recording data discontinuously read out on the cluster-by-cluster basis from the memory means by the memory control means may be continuously recorded on a recording track of the optical disc by controlling the recording positions by recording control means.

When the abnormality detection means detect an abnormality in the recording operation by the recording means, the laser power of the recording means is lowered by resetting control means, while the recording means are controlled so as to be reset from the abnormal state to the normal state to maintain continuity of the recording data.

DETAILED DESCRIPTION OF PREFERRED EMBODIMENT

Figure 1:
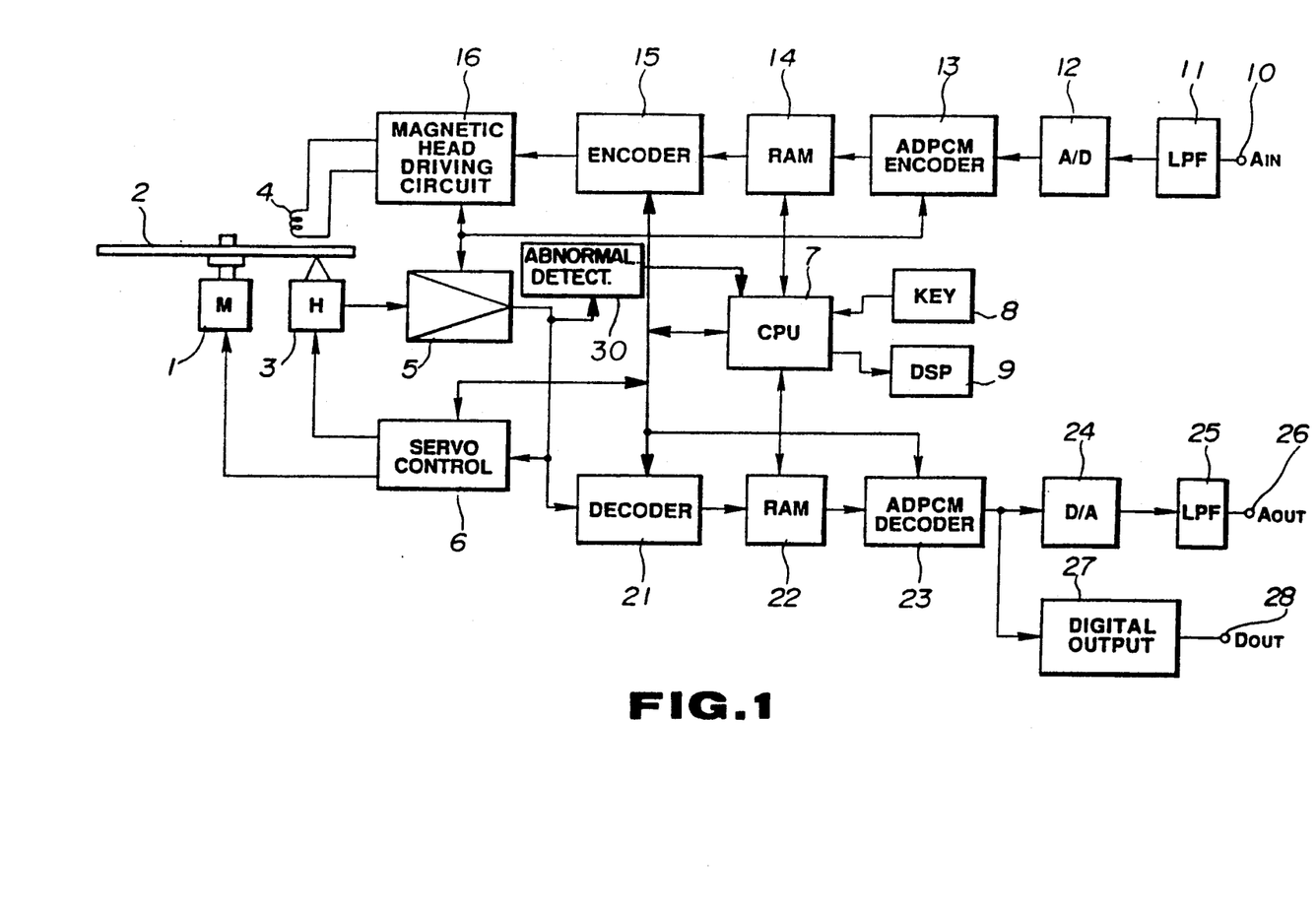
FIG. 1 is a block diagram showing the construction of an optical disc recording/reproducing apparatus embodying the present invention.

FIG. 1 is a schematic block circuit diagram showing the construction of an optical disc recording/reproducing apparatus according to an embodiment of the present invention.

In the disc recording/reproducing apparatus, a magneto-optical disc 2 rotationally driven by a spindle motor 1 is employed as a recording medium. While a laser light is irradiated by an optical head 3 on the magneto-optical disc 2, a modulating magnetic field consistent with recording data is applied by a magnetic head 4 to the magneto-optical disc 2 for recording data along a recording track of the disc 2. On the other hand, the recording track of the magneto-optical disc 2 is traced with a laser light by the optical head 3 for photomagnetically reproducing the recorded data.

The optical head 3 is constituted by a laser light source, such as a laser diode, optical components, such as a collimator lens, an object lens, a polarization beam splitter or a cylindrical lens, and a split photodetector, and is arranged for facing the magnetic head 4 with the magneto-optical disc 2 in-between. For recording data on the magneto-optical disc 2, the optical head 3 irradiates a laser light on a target track on the magneto-optical disc 2 for recording data by thermomagnetic recording. A modulating magnetic field consistent with the recording data is applied to the target track by the magnetic head 4 which is driven by a head driving circuit 16 of the recording system which will be explained subsequently. The optical head 3 detects a laser light irradiated on and reflected by the target track for detecting the focusing error by a so-called astigmatic method as well as detecting the tracking error by a so-called push-pull method. When reproducing data from the magneto-optical disc 2, the optical head 3 detects the difference of a polarization angle (Kerr rotation angle) of the reflected laser light from the target track to produce playback signals.

The output of the optical head 3 is supplied to an RF circuit 5. The RF circuit 5 extracts the focusing error signal and the tracking error signal from the output of the optical head 3 and transmits the extracted signals to a servo control circuit 6 while converting the reproduced signals into corresponding binary signals and supplying the binary signals to a decoder 21 of the reproducing system, which will be explained subsequently. The RF circuit 5 also supplies the extracted signals to an abnormality detection circuit 30, (FIG. 2).

The servo control circuit 6 is constituted by a focusing servo circuit, a tracking servo circuit, a spindle motor servo control circuit and a thread servo control circuit, although these circuits are not shown. The focusing servo control circuit executes focusing control of an optical system of the optical head 3 so that the focusing error signal will be reduced to zero. The tracking servo control circuit executes tracking control of the optical system of the optical head 3 so that the tracking error signal will be reduced to zero. The spindle motor servo control circuit controls the spindle motor 1 for rotationally driving the magneto-optical disc 2 at a predetermined rotational velocity, such as at a constant linear velocity. The thread servo control circuit causes the optical head 3 and the magnetic head 4 to be moved to a target track position on the magneto-optical disc 2 designated by the system controller 7. The servo control circuit 6, which performs these various control operations, transmits the information indicating operating states of components controlled by the servo control circuit 6 to the system controller 7.

Figure 2:
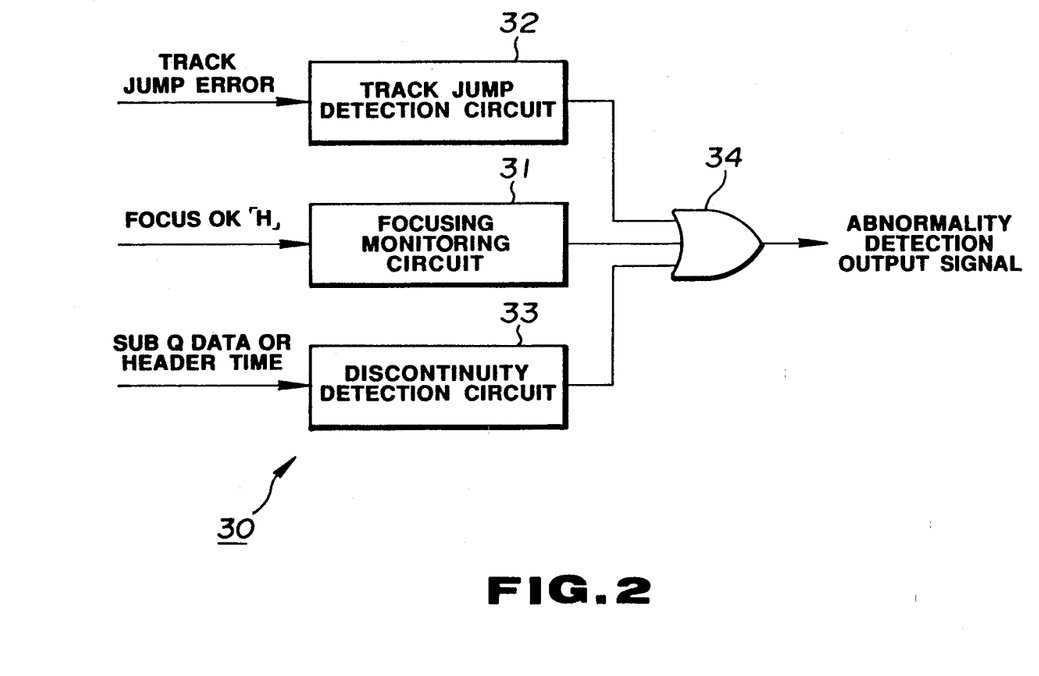
FIG. 2 is a block diagram showing a constitution of an abnormality detection circuit provided in the optical disc recording/reproducing apparatus shown in FIG. 1.

Referring to FIG. 2, the abnormality detection circuit 30 includes a focusing monitoring circuit 31 for monitoring the focusing state of the optical head 3 based on the focusing error signals supplied from the RF circuit 5 for detecting the focusing state of the optical head 3, a track jump detection circuit 32 for detecting an occurrence of a track jump based on the tracking error signal, and a discontinuity detection circuit 33 for detecting discontinuities in the subcode 2 data or header time, and supplies detection output of these circuits as an abnormality detection output signal to the system controller 7.

To the system controller 7 are connected a key input operating section 8 and a display section 9. This system controller 7 controls the recording system and the reproducing system with the operating mode designated by an operating input information from the key input operating section 8. The system controller 7 supervises, on the basis of a sector-by-sector address information reproduced from the recording track of the magneto-optical disc 2 by the header time or sub-Q data, the recording position as well as the reproducing position on the recording track traced by the optical head 3 and the magnetic head 4. The system controller 7 causes a bit compression mode to be displayed on a display section 9 on the basis of bit compression mode data in the reproduced data obtained from the RF circuit 5 by means of a reproducing system as later described, or of bit compression mode data in the ADPCM encoder 13 selected by the key input operating section 8. The system controller also causes the playback time to be displayed on the display section 9 on the basis of a data compression ratio and the reproducing position data on the recording track in the bit compression mode.

For displaying the playback time, the sector-by-sector address information (absolute time information), reproduced from the recording track of the magneto-optical disc 2 with the head time or sub-Q data, is multiplied by a reciprocal of the data compression ratio in the bit compression mode (four in case of ¼ compression) to find an actual time information for display on the display section 9. It is noted that, if an absolute time information has been recorded (preformatted) on a recording track of a magneto-optical disc, the preformatted absolute time information may be read during recording and multiplied by the reciprocal of the data compression ratio for display of the current position in the form of the actual recording time.

It is noted that the recording system of the disc recording/reproducing apparatus is provided with an A/D converter 12 to which an analog audio signal $A_{IN}$ is supplied from an input terminal 10 by way of a low-pass filter 11.

The A/D converter 12 quantizes the audio signal $A_{IN}$. The digital audio data obtained at the A/D converter 12 is transmitted to an adaptive differential pulse code modulating encoder (ADPCM encoder) 13. The ADPCM encoder 13 processes the prescribed transfer rate digital audio data quantized from the audio signal $A_{IN}$ by the ADPCM encoder 13 by a data compressing operation in conformity with the various modes in the CD-I system shown in Table I, and has its operating mode designated by the system controller 7. For example, in the B-level mode of Table 1, the digital audio data are processed into compressed data (ADPCM audio data) having a sampling frequency of 37.8 kHz and the number of bits per sample equal to 4, before being supplied to a memory 14. The data transfer rate with the B-level stereo mode is reduced to 18.75 sectors/second.

In the embodiment of FIG. 1, it is assumed that the sampling frequency of the A/D converter 12 is fixed at the sampling frequency of the standard CD-DA format, or 44.1 kHz, and that, in the ADPCM encoder 13, bit compression from 16 bits to 4 bits is performed after conversion of the sampling rate in conformity to the compression mode, for example, from 44.1 kHz to 37.8 kHz for level B. Alternatively, the sampling frequency of the A/D converter 12 itself may be switched as a function of the compression modes. In this case, the cut-off frequency of the low-pass filter 11 is also switched as a function of the controlled sampling frequencies of the A/D converter 12. That is, the sampling frequency of the A/D converter 12 and the cut-off frequency of the low-pass filter 11 may be simultaneously controlled in dependence upon the compression modes.

The memory 14 is used as a buffer memory in which data writing and readout are controlled by the system controller 7 and which transiently stores ADPCM audio data supplied from the ADPCM encoder 13 for continuous recording on the disc as the occasion may demand. That is, in the B-level stereo mode, the compressed audio data supplied from the ADPCM encoder 13 has its transfer rate reduced to 18.75 sectors/second, these compressed data being continuously written in the memory 14. Although it suffices to record the compressed data (ADPCM data) at a rate of every four sectors, as explained hereinbefore, it is practically impossible to record the data at this rate on a real time basis, and hence the sectors are recorded continuously as later explained. Such recording is performed in a burst fashion (discontinuously) at a standard data transfer rate of 75 sectors/second, by taking advantage of a quiescent period, with a cluster, composed of a predetermined number of, e.g. 32 sectors, as a data recording unit. That is, in the memory 14, the B-level stereo mode ADPCM audio data, which has been continuously written at the lower transfer rate of 18.75 (=75/4) sectors/second conforming to the data compression ratio, is read out as record data in a burst fashion at the above mentioned transfer rate of 75 sectors/second. The overall data transfer rate of the data read out and recorded in this way, inclusive of the non-recording period, is a lower rate of 18.75 sectors/second. However, an instantaneous data transfer rate within the time of the burst-like recording operation is equal to the above mentioned standard rate of 75 sectors/second. Therefore, if the rotational velocity of the disc is the same as that of the standard CD-DA format, that is, a constant linear velocity, recording is made at the same recording density and with the same recording pattern as those of the CD-DA format.

The ADPCM audio data is read out from memory 14 in a burst fashion at the transfer rate of 75 sectors/second, that is, the record data, is supplied to an encoder 15. With a data string supplied from memory 14 to encoder 15, a data unit continuously recorded with each recording is composed of a plurality of, e.g. 32 sectors, and a few cluster-linking sectors arrayed before and after the cluster. The cluster-linking group has a length longer than a interleaving length at the encoder 15, so that, even when the sector undergoes interleaving, data of other clusters remain unaffected. Details of the recording on the cluster-by-cluster basis will be discussed later by referring to FIG. 3.

The encoder 15 processes the record data supplied in a burst fashion from the memory 14 with an error correcting coding operation, such as by parity addition or interleaving, or eight-to-fourteen modulation (EFM). The recording data. thus encoded by the encoder 15, is supplied to the magnetic head driving circuit 16.

To the magnetic head driving circuit 16 is connected the magnetic head 4 which drives the magnetic head 4 to apply a modulating magnetic field conforming to the record data to the magneto-optical disc 2.

On the other hand, the system controller 7 performs a recording position controlling operation for the memory 14 and, based on the controlling operation, performs a disc recording position control so that the above mentioned record data read out in a burst fashion from memory 14 will be recorded continuously on the recording track of the magneto-optical disc 2. For the recording position control, the record position of the record data read out in a burst fashion from the memory 14 is supervised by the system controller 7, and control signals designating the record position on the recording track of the magneto-optical disc 2 are supplied to the servo control circuit 6.

If an abnormality, such as track jump or defocusing, should have occurred during the recording operation, the system controller 7 performs a control operation of immediately lowering the laser power of the optical head 3 based on the abnormality detection signal from the abnormality detection circuit 30 to prevent a mistaken recording and resetting the recording system under this condition from the abnormal state to the normal state.

The reproducing system in the disc recording/reproducing apparatus is hereinafter explained.

The reproducing system reproduces the record data continuously recorded by the above described recording system on the recording track of the magneto-optical disc 2, and is provided with the decoder 21, to which is supplied a playback output, which has been generated by the optical head 3 tracing the recording track on the magneto-optical disc 2 with a laser light, and which has been converted into binary format signals by the RF circuit 5.

The decoder 21 is associated with the encoder 15 in the above described recording system, and processes the playback output, converted into the binary format signals by the RF circuit 5, with the above mentioned decoding for error correction and EFM decoding, and reproduces the above mentioned B level stereo mode ADPCM audio data at a transfer rate of 75 sectors/second which is faster than the normal transfer rate in the above mentioned B level stereo mode. The reproduced data, produced by the decoder 21, is supplied to a memory 22.

The memory 22 has its data writing and readout controlled by the system controller 7 so that the playback data supplied from decoder 21 at a transfer rate of 75 sectors/second is written in a burst fashion at the transfer rate of 75 sectors/second. Also the playback data written in a burst fashion at the transfer rate of 75 sectors/second in the memory 22 are continuously read out therefrom at the regular B-level stereo mode of 18.75 sectors/second.

The system controller 7 also performs a memory control of writing the reproduced data in the memory 22 at the transfer rate of 75 sectors/second, continuously reading out the playback data from the memory 22 at the transfer rate of 18.75 sectors/second.

The system controller 7 performs, besides the above mentioned memory control operation for memory 22, a reproducing position control from the recording track of the magneto-optical disc 2, in such a manner that the playback data written in a burst fashion by the above mentioned memory control in the memory 22 is reproduced continuously from the recording track of the disc 2. The reproducing position control is performed by supervising a reproducing position on the disc of the above mentioned playback data written in a burst fashion in the memory 22 by system controller 7 and by supplying a control signal designating the reproducing position on the recording track of the magneto-optical disc 2 to the servo control circuit 6.

The B-level stereo mode ADPCM audio data, obtained as playback data read out continuously from memory 22 at a transfer rate of 18.75 sectors/second, are supplied to the ADPCM decoder 23.

This ADPCM decoder 23 is associated with the ADPCM encoder 13 of the recording system, and has its operating mode designated by system controller 7. With the present disc recording/reproducing apparatus, the B-level stereo mode ADPCM audio data are expanded by a factor of four for reproducing the digital audio data. The reproduced digital audio data is transmitted by the ADPCM decoder 23 to a D/A converter 24.

The D/A converter 24 causes the digital audio data supplied from the ADPCM decoder 23 to be converted into an analog audio signal $A_{OUT}$. The analog audio signal $A_{OUT}$, obtained at the D/A converter 24, is outputted via a low-pass filter 25 at an output terminal 26.

The reproducing system of the disc recording/reproducing apparatus of the present embodiment is provided with a digital outputting function so that the digital audio data at the output of the ADPCM decoder 23 is outputted at a data output terminal 28 via a digital output encoder 27 as a digital audio signal $D_{OUT}$.

The recording/reproducing operation by the above described disc recording/reproducing apparatus will be explained in more detail with respect to FIG. 3.

The record data, that is data read out from the memory 14, is arranged into a cluster at an interval of a predetermined number of, e.g. 32, sectors or blocks, and several cluster-linking sectors are arrayed between adjoining clusters. These cluster-linking clusters form a cluster-linking group such that one cluster-linking group lies between two adjoining clusters. In more detail, each cluster $C_n$ consists of 32 sectors or blocks B0 to B31, and five cluster-linking sectors L1 to L5, a cluster-linking group, are arranged between these clusters $C_n$ for linking the adjoining clusters. For recording a cluster, such as a k'th cluster $C_k$, the 32 sectors B0 to B31 of the cluster $C_k$ and several cluster-linking sectors ahead and at the back of the cluster $C_k$, namely the three cluster-linking sectors L3 to L5 towards the cluster $C_{k-1}$ (run-in sectors) and the three cluster-linking sectors L1 to L3 towards the cluster $C_{k+1}$ (run-out sectors), making a total of 38 sectors, are recorded as one unit (record unit). Dummy data, such as 0, are arrayed in the linking sectors L1 to L5. The 38-sector record unit is transmitted from the memory 14 to the encoder 15 where interleaving is carried out for data rearrangement over a distance of up to 108 frames corresponding to about 1.1 sector. However, the data within the cluster $C_k$ are safely contained within a range of from the run-in blocks L3 to L5 to the run-out blocks L1 to L3 without affecting the remaining clusters $C_{k-1}$ or $C_{k+1}$. Meanwhile, dummy data, such as 0, are arrayed in the linking sectors L1 to L5 to avoid adverse effects which interleaving might have on the data per se. When recording the next cluster $C_{k+1}$, three cluster-linking sectors L3 to L5 of the cluster-linking group L1 to L5 between the current cluster and the next cluster $C_{k+1}$ are used as the run-in sectors, so that the sector L3 is recorded superfluously without causing any inconvenience. The cluster-linking sector L3 of the run-in sectors or the cluster-linking sector L3 of the run-out block may be omitted, so that recording may be performed with the remaining 37 sectors as a unit.

By recording on the cluster-by-cluster basis, there is no necessity of taking account of an interference with the adjoining clusters by interleaving, so that data processing may be simplified significantly. On the other hand, if the record data should be unable to be recorded normally due to malfunctions, such as defocusing, detracking, etc., re-recording may be made on the cluster-by-cluster basis and, if the record data should be unable to be reproduced effectively, re-reading may be made on a cluster-by-cluster basis.

Figure 4:
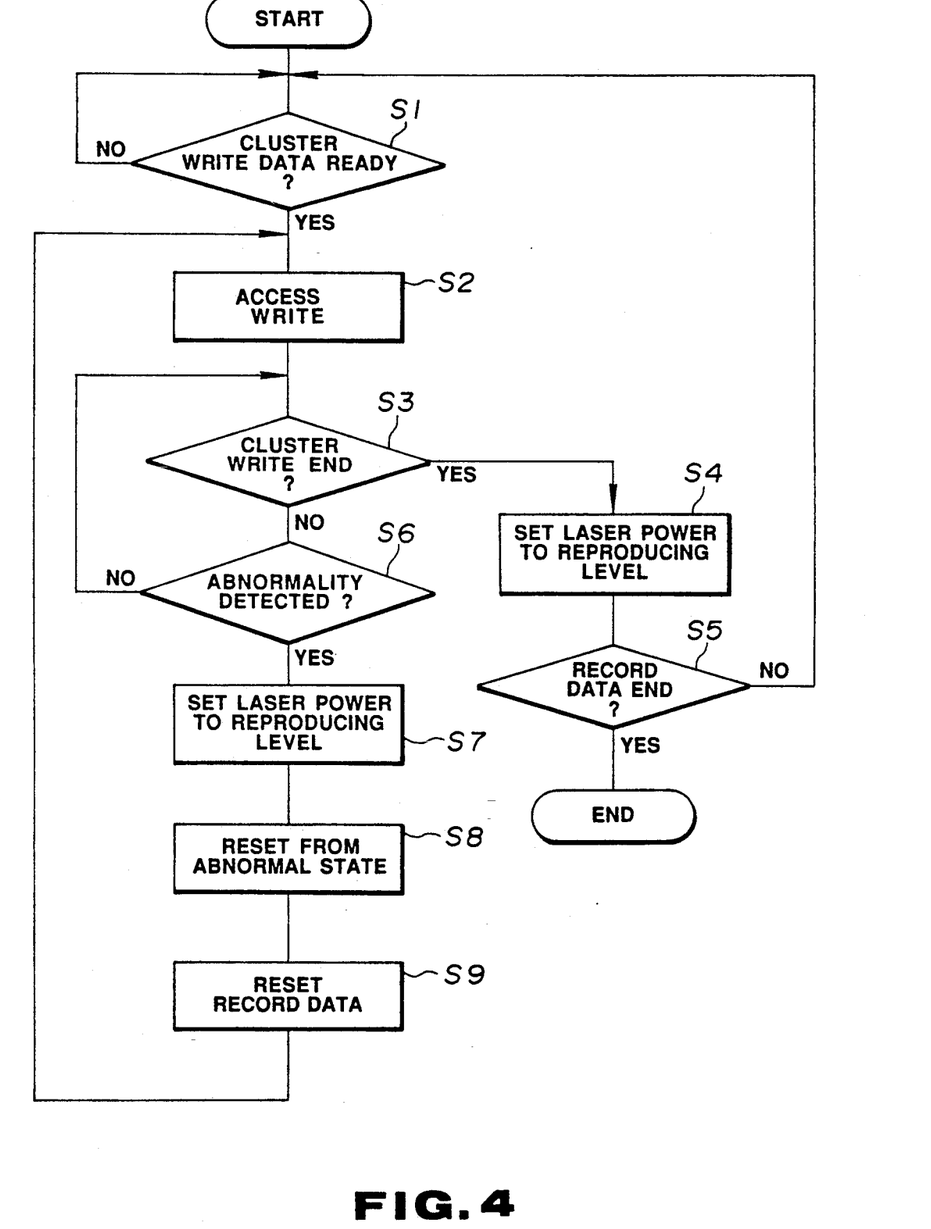
FIG. 4 is a flow chart showing a control operation of a recording mode of a system controller in the optical disc recording/reproducing apparatus shown in FIG. 1.

With the optical disc reproducing apparatus of the present embodiment, the system controller 7 performs, during the recording mode, a record control operation shown for example in a flow chart of FIG. 4.

During the recording mode, the system controller 7 awaits at step $S_1$ until one cluster of recording data is available. When the one cluster of recording data is in order, system controller 7 proceeds to step $S_2$ to access the optical head 3 and the magnetic head 4 to record one cluster of recording data on the magneto-optical disc 2. At the next step $S_3$, system controller 7 monitors the end of recording of the one cluster of recording data. When the recording of the one cluster of recording data comes to an end, system controller 7 proceeds to step $S_4$ to set the laser power of the optical head 3 to a reproducing level. At the next step $S_5$, it is checked if recording of all of the record data has come to an end and, if there is any record data, system controller 7 reverts to step $S_1$ to continue the recording operation. If the recording has come to an end, the control operation of the record mode is terminated.

During monitoring of the end of recording of the one cluster of record data during step $S_3$, it is checked at step $S_6$ if an abnormality has been detected by the abnormality detection circuit 30. Unless an abnormality is detected, system controller 7 reverts to step $S_3$ to continue the monitoring operation, however, if an abnormality is detected, system controller 7 reverts to step $S_7$ to set the laser power of the optical head 3 to the reproducing level immediately. At step $S_8$, the recording system is reset from the abnormal state and, after again setting at step $S_9$ the record data at the leading end of the cluster where the abnormality has been detected, system controller 7 reverts to step $S_2$ to re-start the recording operation.

In this manner, the recording operation is performed on the cluster-by-cluster basis and, if an abnormality is detected by the abnormality detection circuit 30, recording is re-started at the leading end of the cluster to maintain continuity of record data.

Figure 5:
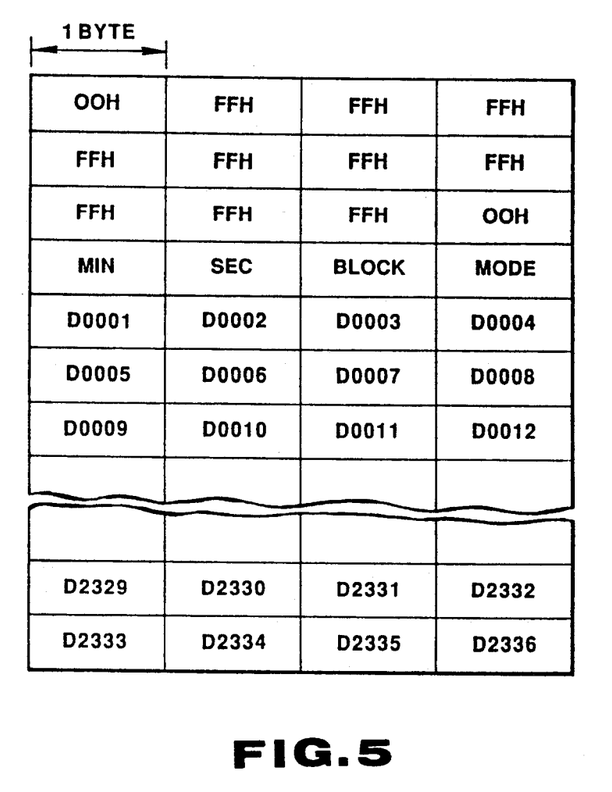
FIG. 5 shows an example of a data structure of one sector or block.
Figure 6:
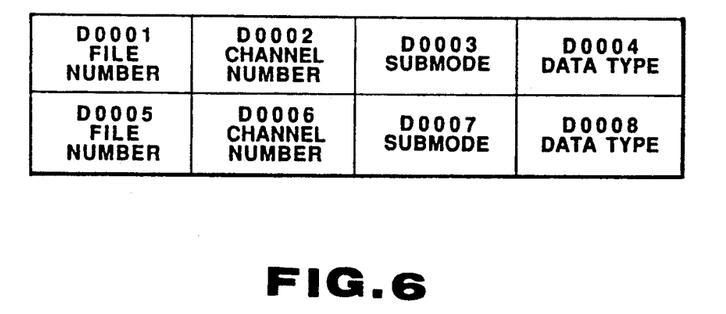
FIG. 6 shows the contents of a sub-header.
Figure 7:
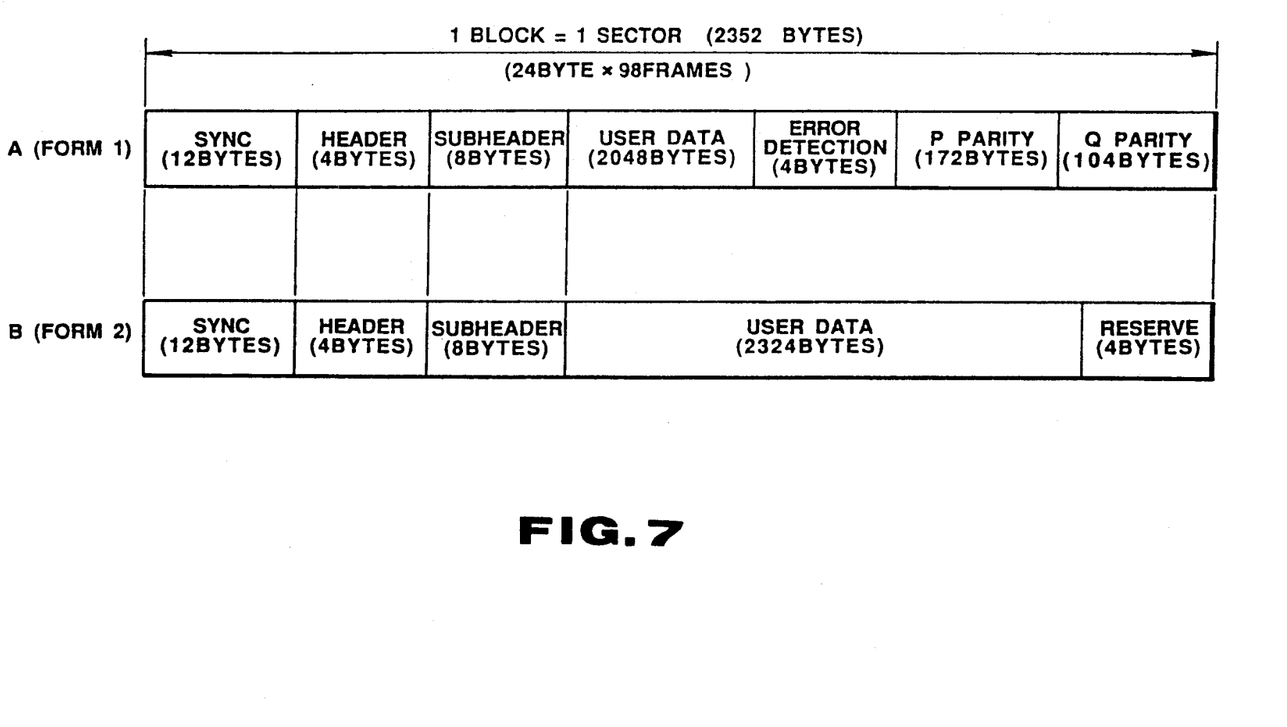
FIG. 7 shows an example of a data structure in one sector of a so-called CD-I.

Meanwhile, each sector or block consists of 12 synchronizing bytes, 4 header bytes and 2336 bytes of data per se D0001 to D2336, arrayed in this order, making a total of 2352 bytes. This sector or block array is represented as a two-dimensional array, as shown in FIG. 5, wherein the 12 synchronization bytes consist of the first byte OOH, ten bytes FFH and the last byte OOH in the hexadecimal system (H is a hexadecimal number). The next 4-byte header consists of address parts for minute, second and block, each one byte, and a mode data byte. These mode data mainly indicate a CD-ROM mode, while the sector structure shown in FIGS. 3 or 5 corresponds to the mode 2 of the CD-ROM format. The CD-I is a standard employing the mode 2 and the contents of the data D0001 to D0001 are prescribed as shown in FIG. 6.

Figure 3:
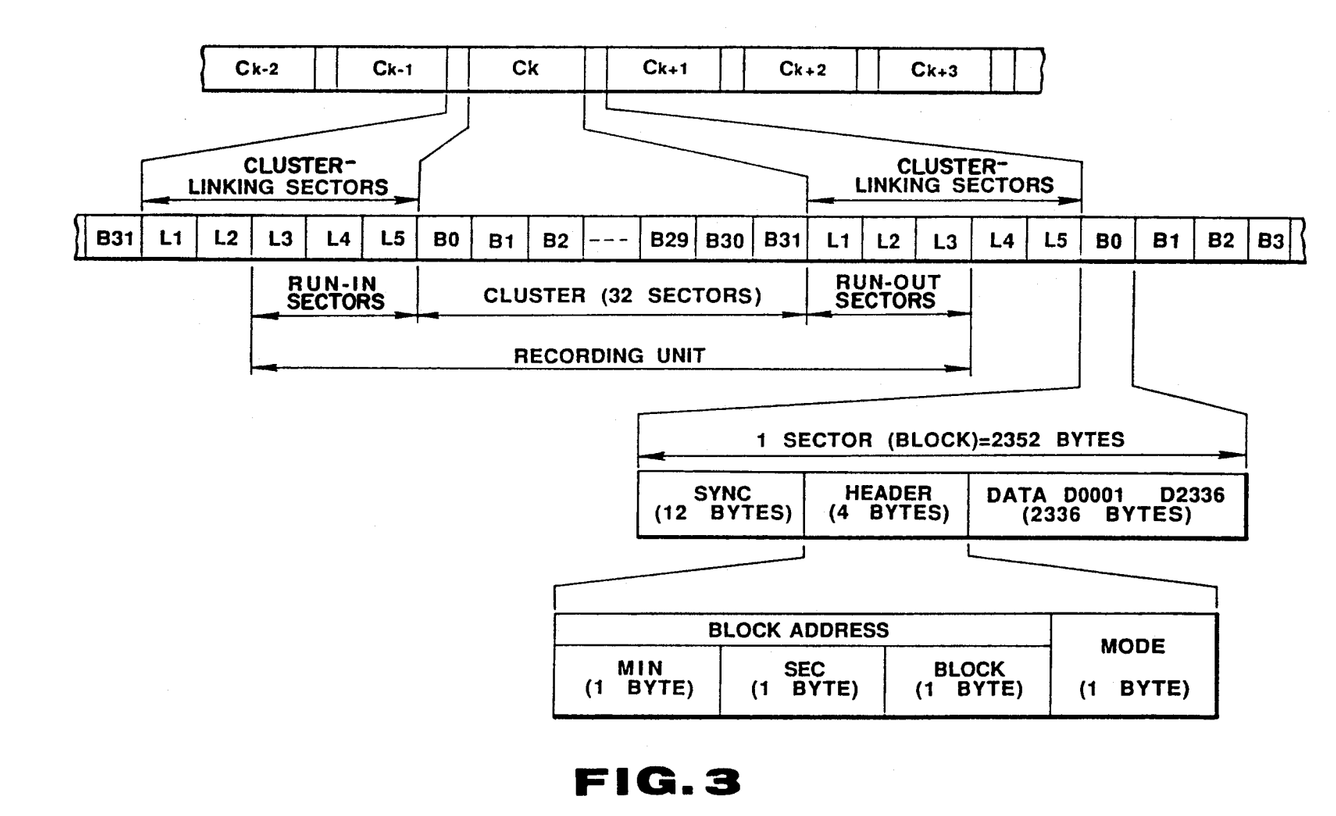
FIG. 3 shows a format of a cluster arrangement as a recording unit.

FIG. 5 shows forms 1 and 2 of the CD-I standard, in which 12 synchronizing bytes and 4 header bytes are the same as those of the CD-ROM mode 2 shown in FIGS. 3 and 5. The next 8 subheader bytes are prescribed as shown in FIG. 4 wherein data D0001 and D0005 are file numbers, data D0002 and D0006 are channel numbers, data D0003 and D0007 are subcode data and data D0004 and D0008 are data type data. The data D0001 to D0004 and data D0005 to D0008 are the same data written in duplicate. The next 2328 bytes consist of 2048 user data bytes, four error-detecting bytes, 172 P parity bytes and 104 Q parity bytes, for form 1 of FIG. 7A. This form 1 is used for recording letter data, binary data and high compression video data. The 2328 bytes for form 2 of FIG. 7B consist of 2324 user data bytes, downstream of the sub-header data, and the remaining 4 reserve data bytes. This form 2 is used for recording compressed audio data or video data. In the case of the compressed audio data, 18 128-byte sound groups (2304 bytes) are arrayed in the 2324 user data bytes, with the remaining 20 bytes representing a vacant space.

Figure 8:
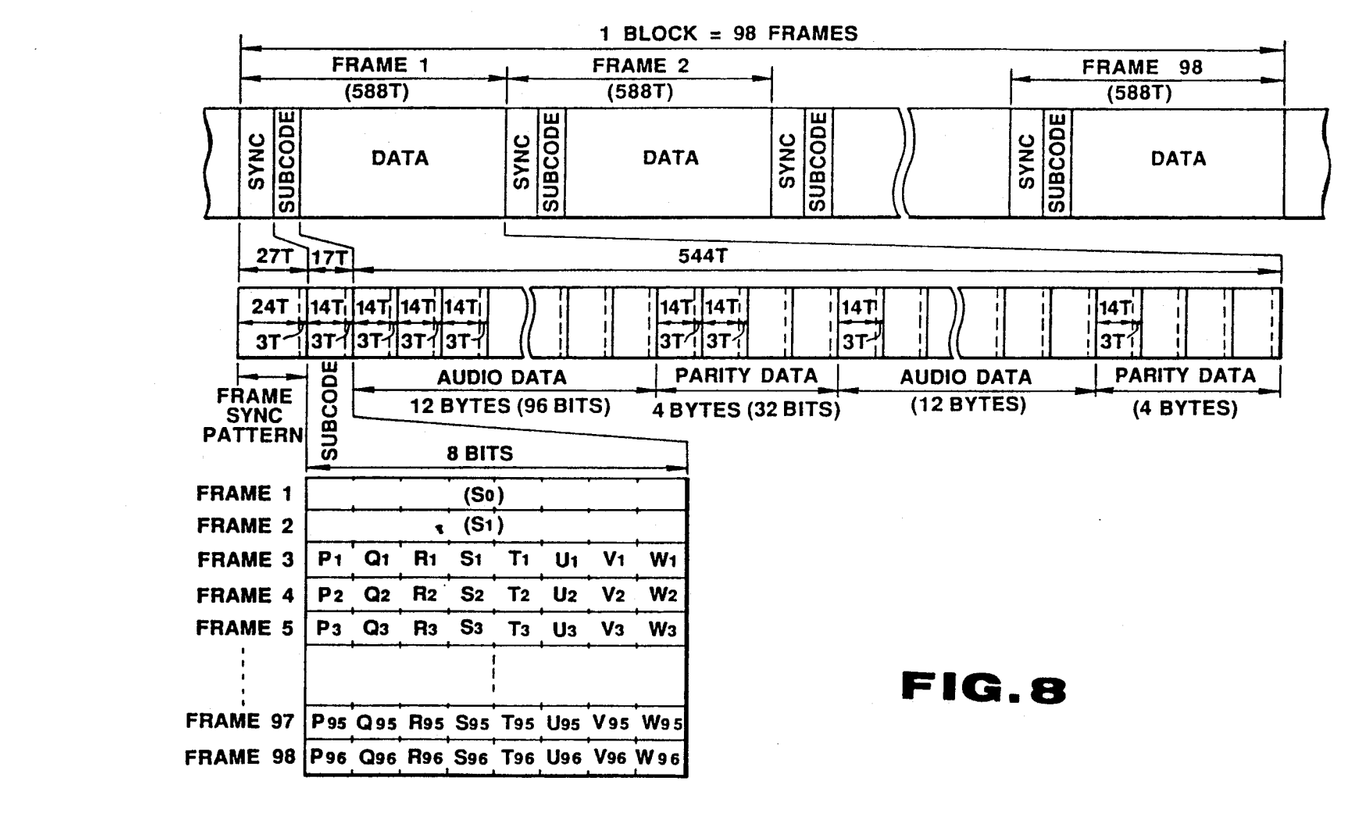
FIG. 8 shows a format of a frame and a block (sector) in the CD standard.

Meanwhile, when recording the above-described sector-based data on a disc, a coding operation such as parity addition or interleaving or EFM encoding is carried out by the encoder 15, so that recording is performed with a recording format shown in FIG. 8.

Referring to FIG. 8, each block or sector consists of 98 frames of 1st to 98th frames, with each frame being 588 times a channel clock period T, i.e. 588T. Within each frame, there are a frame synchronizing pattern part of 24T (plus 3T for linking), a subcode part of 14T (plus 3T for linking) and data part of 544T (for audio data and parity data). The 544 T data part consists of 12 bytes or symbols of audio data, 4 bytes of parity data, 12 bytes of audio data and 4 bytes of parity data which have been processed by EFM (eight-to-fourteen modulation). Audio data in each frame is constituted by 24 bytes or 12 words because each word of the audio sample data consists of 16 bits. The subcode part is the 8-bit subcode data which has undergone EFM and is arrayed in a block with 98 frames as a unit, each bit constituting one of eight subcode channels P to W. The subcode parts of the first and second frames are block synch patterns $S_0$ and $S_1$ which violate the EFM rule, each of the subcode channel P to W being constituted by 96 bits for the third to 98 the frames.

The above mentioned audio data, recorded after interleaving, are deinterleaved during reproduction into audio data of a data array conforming to the regular time sequence. The CD-I data, such as are shown in FIGS. 3 and 5, may be recorded in place of the audio data.

Figure 9:
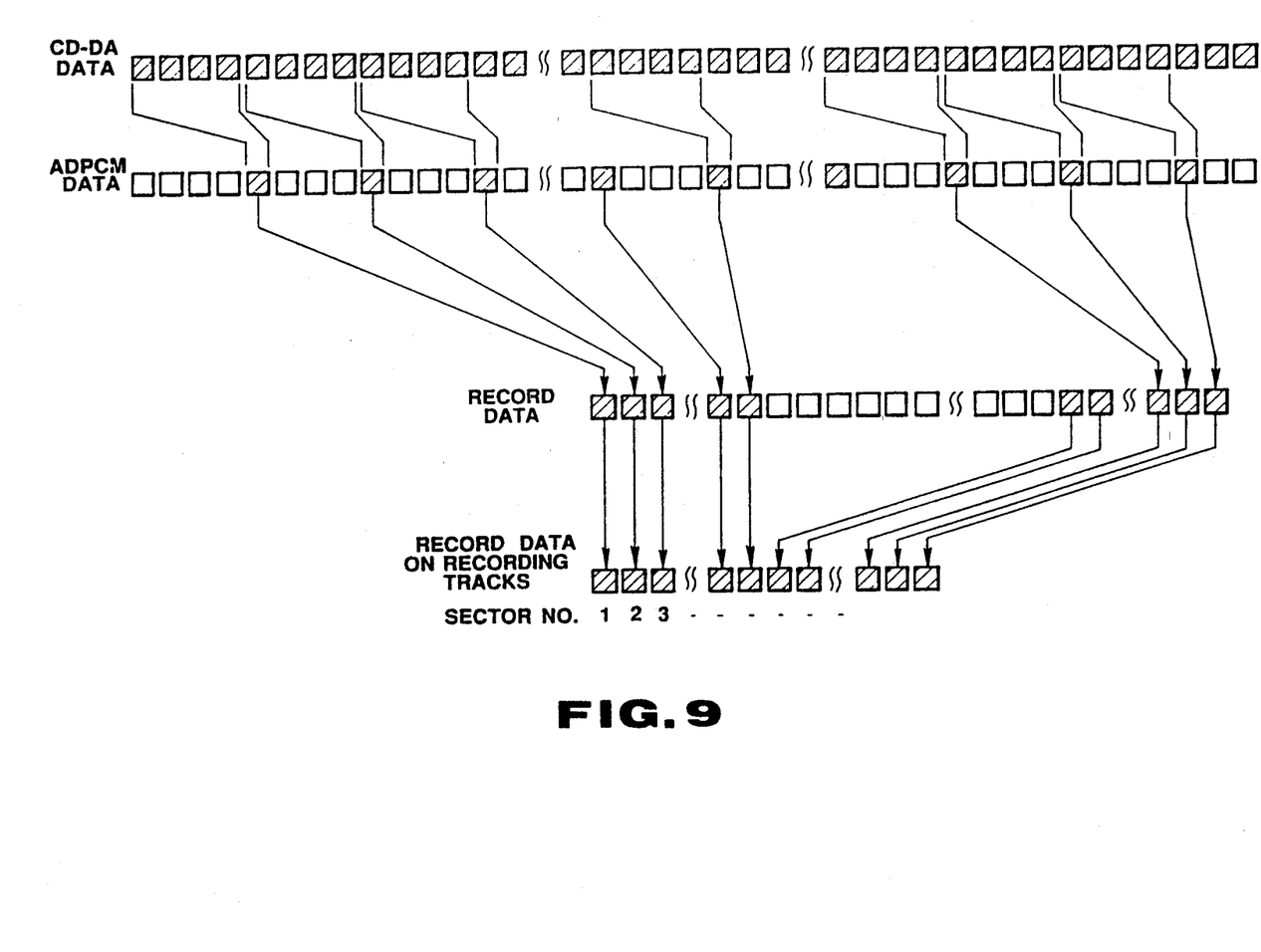
FIG. 9 shows a data format employed in the optical disc recording/reproducing apparatus.

Meanwhile, digital data obtained at the A/D converter 12 in the disc recording/reproducing apparatus shown in FIG. 1, are data similar to those of the CD-DA format, that is the audio PCM data with the sampling frequency of 44.1 kHz, the number of quantization bits equal to 16 and a data transfer rate of 75 sectors/second, as shown in FIG. 9. When the data is transmitted to the ADPCM encoder 13 so as to be bit-compressed to the above-mentioned stereo mode, the digital data are converted into data with a sampling frequency of 37.8 kHz and the number of quantization bits is compressed to four bits. Thus the output data are the ADPCM audio data having the data transfer rate reduced by ¼, or to 18.75 sectors/second. The B level stereo mode ADPCM audio data, continuously outputted at a transfer rate of 18.75 sectors/second from the ADPCM encoder 13, are supplied to the memory 14.

Figure 10:
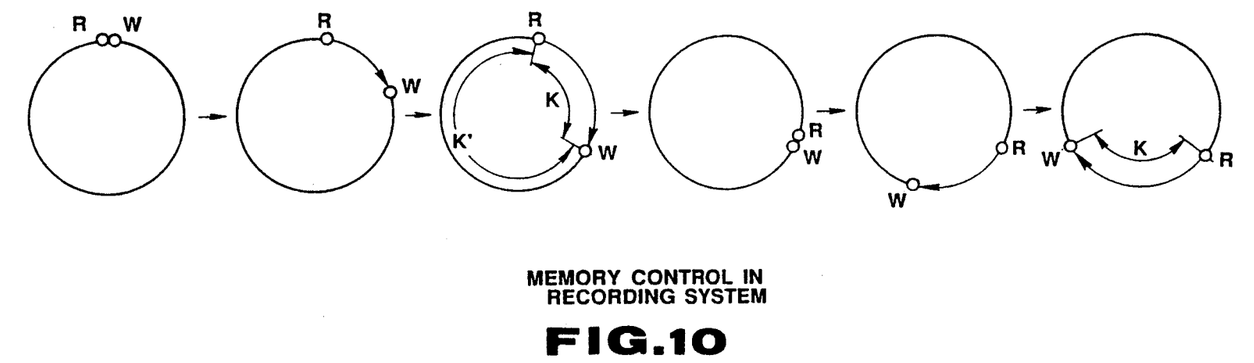
FIG. 10 shows the status of a memory-controlled memory in a recording system of the optical disc recording/reproducing apparatus shown in FIG. 1.

Referring to FIG. 10, the system controller 7 controls the memory 14 in such a manner that a write pointer W of the memory 14 is continuously incremented at a transfer rate of 18.75 sectors/second to continuously write the ADPCM audio data in the memory 14 at a transfer rate of 18.75 sectors/second and, when the amount of data of the ADPCM audio data stored in the memory 14 exceeds a predetermined volume K, a read pointer R of the memory 14 is incremented in a burst fashion at the transfer rate of 75 sectors/second to read out a predetermined volume K of the ADPCM data in a burst fashion from the memory 14 as record data at the above mentioned transfer rate of 75 sectors/second. It is noted that the above predetermined volume K has one cluster of data as a unit.

That is, in the recording system of the disc recording/reproducing apparatus shown in FIG. 1, the ADPCM audio data continuously outputted at the transfer rate of e.g. 18.75 sectors per second from the ADPCM encoder 13 are written in the memory 14 at the above mentioned transfer rate of 18.75 sectors/second. When the amount of data of the ADPCM data stored in the memory 14 exceeds the predetermined amount of data K, the amount of data K of the ADPCM audio data is read out in a burst fashion from memory 14 at the transfer rate of 75 sectors/second as record data, so that input data can be continuously written in the memory 14 while a data write region K' in excess of a predetermined volume is perpetually maintained within the memory 14. By recording the recording positions on the recording track of the magneto-optical disc 2 under control by the system controller 7, the record data read out in a burst fashion from the memory 14 can be recorded consecutively on the recording track on the magneto-optical disc 2. Since a data-depleted region in excess of a predetermined volume is maintained in the memory 14, data can be continuously written in the data-depleted region in excess of the predetermined volume even if the system controller 7 detects that a track jump etc., due to disturbances or the like, has caused the recording operation on the magneto-optical disc 2 to discontinue. Also, the resetting operation may be carried out in the interim. Thus, input data can be continuously recorded without dropout on the recording track of the magneto-optical disc 2.

Meanwhile, header time data corresponding to the physical address of the sectors are annexed to the ADPCM audio data on a sector-by-sector basis, and recorded on a sector-by-sector basis on the magneto-optical disc 2. Table of contents data indicating the record region and the recording mode are recorded in a table-of-contents region.

Figure 11:
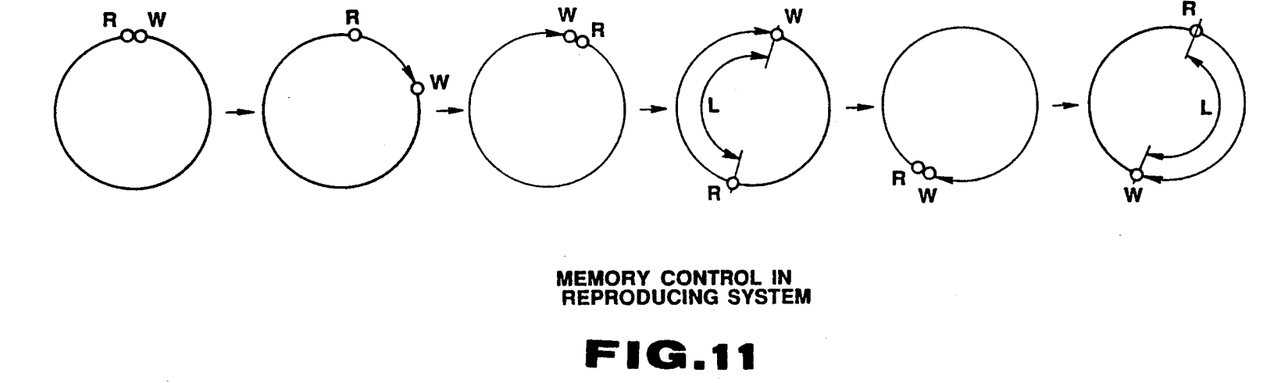
FIG. 11 shows the status of a memory-controlled memory in a reproducing system of the disc recording/reproducing apparatus.

In the reproducing system of the disc recording/reproducing apparatus shown in FIG. 1, the system controller 7 controls the memory 22 in such a manner that, as shown in FIG. 11, the write pointer W of the memory 22 is incremented at a transfer rate of 75 sectors/second to write the reproduced data in the memory 22 at the transfer rate of 75 sectors/second, the read pointer R of the memory 22 is continuously incremented at a transfer rate of 18.75 sectors/second to continuously read out the playback data from memory 22 at the transfer rate of 18.75 sectors/second, and the write pointer W of the memory 22 is intermittently incremented at the transfer rate of 75 sectors/second in a burst fashion, so that, when the write pointer W catches up with the read pointer R, writing is discontinued. When the amount of data of the playback data stored in the memory 22 is lower than the predetermined volume L, writing is started again.

Thus, with the above described reproducing system of the disc recording/reproducing apparatus, the system controller 7 controls the memory 22 in such a manner that the B-level stereo mode ADPCM audio data reproduced from the recording track of the magneto-optical disc 2 is written in a burst fashion in the memory 22 at a transfer rate of 75 sectors/second, and read out continuously from the memory 22 as playback data at the transfer rate of 18.75 sectors/second, so that the playback data may be continuously read out from the memory 22 while the data-depleted region in excess of the predetermined volume L is perpetually maintained within memory 22. Also the playback data intermittently read out from the magneto-optical disc 2 may be continuously reproduced from the recording track on the magneto-optical disc 2 by controlling the reproducing position on the recording track of the magneto-optical disc 2 by the system controller 7. In addition, the data read-out region in excess of the predetermined volume L is perpetually maintained in the memory 22, as described previously, so that, even when the system controller 7 should detect the occurrence of a track jump etc. due to, for example, disturbances, and the operation of reproducing the magneto-optical disc 2 is discontinued, the playback data may be read out from the data readout region having a space in excess of the predetermined amount of data to continue the outputting of the analog audio signals. Since the resetting operation may be executed in the interim, there is no risk of interruption in the reproduced sound.

With the above optical disc recording/reproducing apparatus, description has been made of the recording and reproduction of the B-level stereo mode ADPCM audio data, recording and reproduction may similarly be made of the ADPCM audio data of other modes of the other CD-I systems. As long as the data is PCM audio data of the CD-DA mode, a time compression may be made in the memory 14 in the recording system while the record data may be recorded during the time when the magneto-optical disc 2 is rotationally driven at a velocity conforming to the compression ratio of time compression. In the reproducing system, time expansion may be performed in the memory 22.

With the above described optical disc recording apparatus according to the present invention, input data digitized from analog signals are written in memory means and the input data thus written in the memory means are sequentially read out as record data having a transfer rate faster than the transfer rate of the input data so as to be processed by interleaving by recording means. A cluster-linking group longer than the interleaving length is arrayed between the clusters. The cluster and the cluster-linking group are recorded as one unit on a unit-by-unit basis, which eliminates the effects of interleaving on adjoining clusters. Thus, data may be recorded independently on a cluster-by-cluster basis without the necessity of taking account of the effects of interleaving on other clusters, so that the record data read out discretely on the cluster-by-cluster basis from the memory means by the memory control means may be continuously recorded on the recording track of the optical disc by controlling the recording positions by the recording control means. If an abnormality of the recording operation by the recording means is detected by abnormality detection means, resetting control means lower the laser power of the recording means to prevent mistaken recording. In this state, the recording means is reset from the abnormal state to the normal state and recording is again performed at the leading end of the cluster where the abnormality was detected to maintain continuity of the record data.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. An optical disc recording apparatus for recording digital data on a disc-shaped recording medium by optical means comprising:

memory means for transiently storing input digital data compressed from a digitized analog signal, signal processing means for reading digital data out from the memory means and arranging it into a plurality of clusters at an interval of a predetermined number of sectors, separating each of the clusters by a cluster-linking group, each cluster-linking group including a plurality of sectors such that the cluster-linking group extends beyond data within a cluster to be interleaved in an interleaving operation, and encoding the digital data of the clusters by the interleaving operation, memory control means for performing a readout control of the memory means for reading a predetermined amount of the recording data on a cluster-by-cluster basis when an amount of the input digital data stored in the memory means exceeds a present first predetermined amount of data to maintain a writable space larger than a second predetermined amount of data in the memory means, recording means for continuously recording digital data encoded by the signal processing means on a recording track of the disc-shaped recording medium, abnormality detection means for detecting abnormalities in the recording operation by the recording means, and resetting control means connected to the recording means and the abnormality detecting means for inhibiting the recording operation and for resetting the recording means from an abnormal state to a normal state upon detection of an abnormality by the abnormality detection means.

2. An optical recording apparatus as claimed in claim 1 wherein the memory control means is connected to the abnormality detection means and performs a control operation for again reading out from the memory means, after resetting of the recording means by a resetting control by the resetting control means, record data which could not be recorded because of an abnormality occurring during the recording operation.

3. An optical recording apparatus as claimed in claim 1 wherein the second predetermined amount of data is in excess of an amount of input data inputted to the memory means during the time of resetting the recording means from an abnormal state to a normal state.

4. An optical disc recording apparatus as claimed in claim 3 wherein the first predetermined amount of digital data corresponds to an amount of data for one cluster of data.

5. An optical disc recording apparatus as claimed in claim 1 wherein the cluster-linking group is constituted by dummy data not affecting the digital data in the cluster.

6. An optical disc recording apparatus as claimed in claim 1 wherein each sector corresponds to one block (98 EFM frames) of a compact disc.

7. An optical disc recording apparatus as claimed in claim 1 wherein the abnormality detection means detect detracking and defocusing to check for an abnormality in the recording operation.

8. An optical disc recording apparatus for recording digital data on a disc-shaped recording medium by optical means comprising:

memory means in which input data digitized from analog signals are sequentially written and from which the input data thus written are read out as record data having a transfer rate higher than the transfer rate of the input data, signal processing means for arranging digital data read out from the memory means into a plurality of clusters at intervals of a predetermined number of sectors, inserting between each of the clusters a cluster-linking group of sectors such that the cluster-linking group extends beyond data in a cluster to be interleaved in an interleaving operation, and encoding the digital data of the clusters by the interleaving operation, memory control means for performing a readout control of said memory means for reading a predetermined amount of said recording data on a cluster-by-cluster basis when an amount of data of said input digital data stored in said memory exceeds a present first determined amount of data to maintain a writable space larger than a second predetermined amount of data in the memory means, recording means for continuously recording digital data encoded by the signal processing means on a recording track of the disc-shaped recording medium, abnormality detection means for detecting abnormalities in the recording operation by the recording means, and resetting control means connected to the recording means and the abnormality detecting means for inhibiting the recording operation and for resetting the recording means from an abnormal state to a normal state upon detection of an abnormality by the abnormality detection means.

9. An optical recording apparatus as claimed in claim 8 wherein the memory control means is connected to the abnormality detection means and performs a control operation for again reading out from the memory means, after resetting of the recording means by a resetting control by the resetting control means, record data which could not be recorded because of an abnormality occurring during the recording operation, and wherein the recording means records on the disc-shaped recording medium record data thus again read out of the memory means at recording positions contiguous to record data recorded before the detection of an abnormality.

10. An optical recording apparatus as claimed in claim 8 wherein the second predetermined amount of data is in excess of an amount of input data inputted to the memory means during the time of resetting the recording means from an abnormal state to a normal state.

11. An optical disc recording apparatus as claimed in claim 10 wherein the first predetermined amount of digital data corresponds to an amount of data for one cluster of data.

12. An optical disc recording apparatus as claimed in claim 8 wherein the cluster-linking group is constituted by dummy data not affecting the digital data in the cluster.

13. An optical disc recording apparatus as claimed in claim 8 wherein the abnormality detection means detect detracting and defocusing to check for an abnormality in the recording operation.

14. An optical disc reproducing apparatus as claimed in claim 8 wherein the abnormality means includes means for inhibiting the recording operation on detection of the abnormality in the recording operation by lowering the laser power of the recording means.

* * * * *